(12) United States Patent
Shoen

(10) Patent No.: US 6,779,943 B2
(45) Date of Patent: *Aug. 24, 2004

(54) COUPLING DISCONNECT PREVENTION DEVICE

(75) Inventor: Mark V. Shoen, Phoenix, AZ (US)

(73) Assignee: U-Haul International, Inc., Phoenix, AZ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 183 days.

(21) Appl. No.: 09/567,999

(22) Filed: May 10, 2000

(65) Prior Publication Data

US 2003/0020275 A1 Jan. 30, 2003

(51) Int. Cl.[7] .................................................. F16D 1/00
(52) U.S. Cl. ........................................ 403/344; 403/373
(58) Field of Search ..................... 285/45, 420, 415, 285/414, 367, 366; 403/344, 403

(56) References Cited

U.S. PATENT DOCUMENTS

| 1,477,564 A | | 3/1923 | Norlund et al. | |
|---|---|---|---|---|
| 2,565,659 A | | 8/1951 | Kontra | 70/232 |
| 2,972,492 A | * | 2/1961 | Mintz et al. | 285/420 X |
| 3,284,121 A | | 11/1966 | Lyon | 292/307 |
| 3,380,267 A | | 4/1968 | Winchester | 70/232 |
| 4,326,740 A | | 4/1982 | Guiler | 292/307 B |
| 4,777,811 A | | 10/1988 | Binkley et al. | 70/178 |
| 5,085,535 A | * | 2/1992 | Solberg et al. | 403/344 X |
| 5,412,962 A | | 5/1995 | Thompson | 70/178 |
| 5,531,536 A | * | 7/1996 | Blanchfield et al. | 403/344 |
| 5,704,655 A | | 1/1998 | Lemburg | 285/80 |

* cited by examiner

*Primary Examiner*—John R. Cottingham
(74) *Attorney, Agent, or Firm*—Jeffer, Mangels, Butler & Marmaro LLP

(57) ABSTRACT

A device for shielding a coupling includes a generally central opening in which the coupling is disposed and at least one socket hole into which only a thin wall deep socket can operate to engage and disengage a screw into and from said socket hole. The device prevents tampering with the coupling.

7 Claims, 4 Drawing Sheets

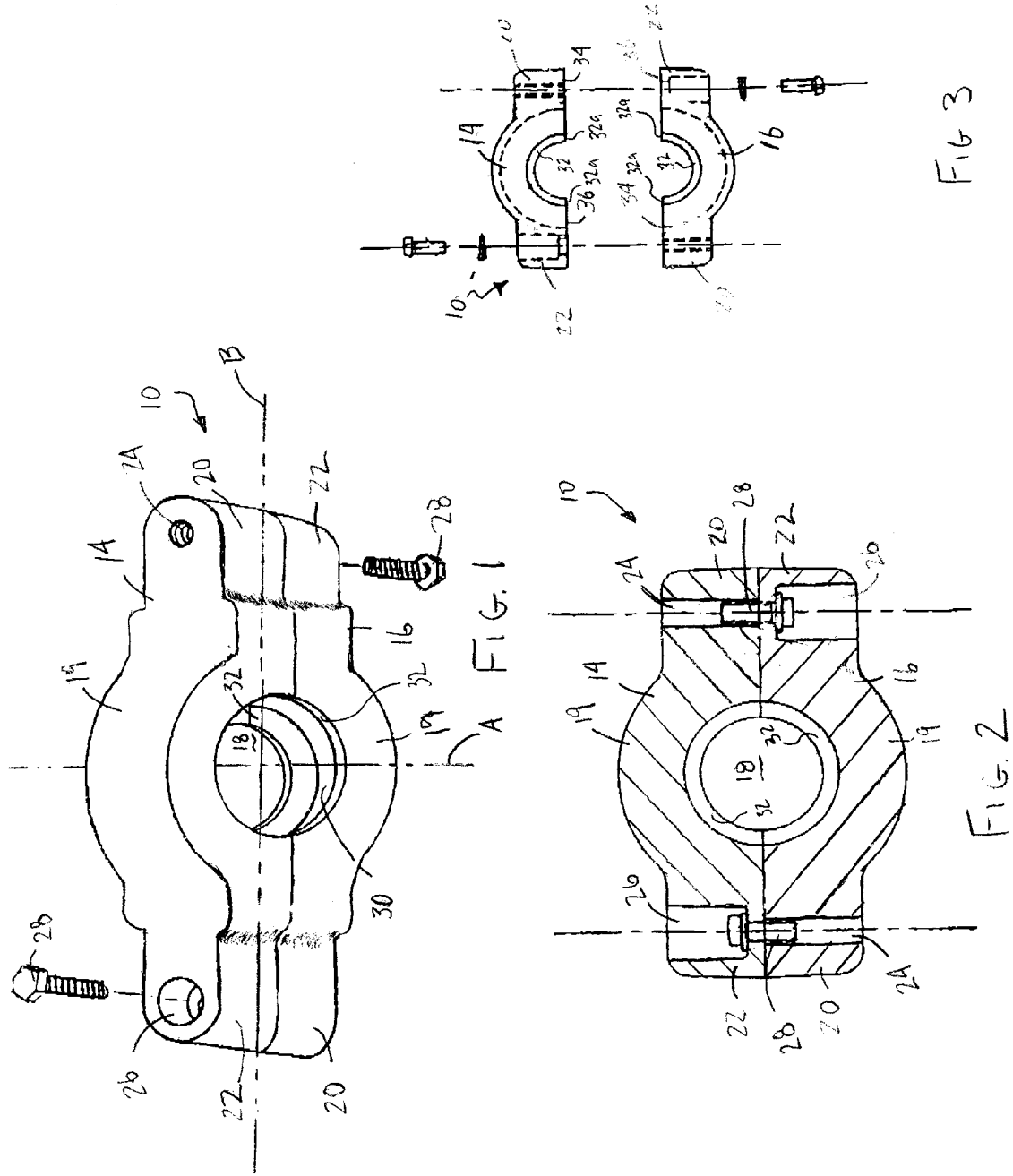

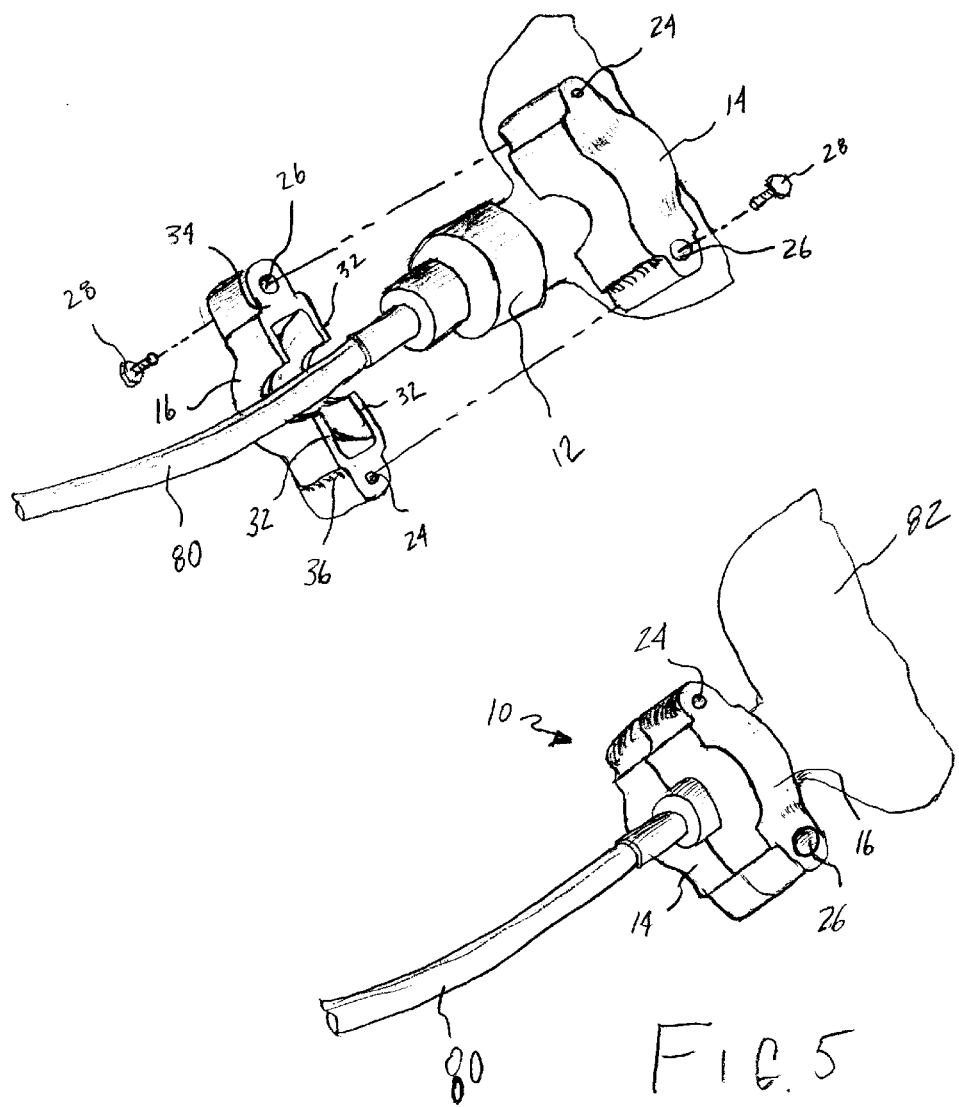

COUPLING DISCONNECT PREVENTION DEVICE

FIELD OF THE INVENTION

The present invention relates to a disconnection preventing device and more particularly to a device for preventing disconnection of a vehicle odometer cable.

BACKGROUND OF THE INVENTION

It is often desirable, by business concerns that rent vehicles, and charge "by the mile," to know how many miles a rented automobile has traveled. This is typically done by noting the odometer reading at the beginning and end of a trip. However, disconnection of the odometer from either the transmission end or the odometer end permits driving of the automobile without indication on the odometer.

In order to prevent disconnection of the odometer cable, locks and security devices have been devised. Prior disconnection prevention devices are often complex and very difficult to install or remove. Removal often requires destroying the device using a saw or the like. Other prior disconnection devices, on the other hand, are easily removable by readily available tools.

A need exists for an odometer cable disconnection prevention device that is simple in design and easy to install and remove with the proper, non-readily available tools.

SUMMARY OF THE INVENTION

In accordance with one aspect of the present invention there is provided a device for shielding a coupling. The device includes a generally central opening in which the coupling is disposed and at least one socket hole into which a thin wall deep socket can operate to engage and disengage a screw into and from said socket hole.

In accordance with another aspect of the present invention there is provided a device for preventing disconnection of a coupling. The device includes first and second halves that are mateable to form an opening and surround the coupling. Each half has a plurality of holes defined therethrough including a first socket hole defined in one of the first and second halves, a first threaded hole defined in the other of the first and second halves that is opposed to the first socket hole, a second socket hole defined in one of the first and second halves, and a second threaded hole defined in the other of the first and second halves that is opposed to the second socket hole. The first and second socket holes are defined on opposite sides of the opening and each socket hole is aligned with a corresponding threaded hole. Each half also includes two threaded fasteners that respectively engage one of the socket holes and threadedly engage the aligned threaded hole.

Preferably, in accordance with another aspect of the present invention there is provided a vehicle including an odometer and an odometer cable having a length and at least one coupling disposed along the length of the odometer cable, wherein a device for preventing disconnection of the coupling partially surrounds the coupling.

In accordance with yet another aspect of the present invention there is provided a device for preventing disconnection of a coupling that includes first and second halves that are mateable to form an opening and surround the coupling. The device includes a plurality of holes defined through the first and second halves including a socket hole defined in the first half, and a threaded hole defined in the second half that is opposed to the socket hole. The device also includes a threaded fastener that engages the socket hole and threadedly engages the threaded hole.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which FIG. 1 is a perspective view showing a disconnection prevention device in accordance with a first embodiment of the present invention.

FIG. 2 is a cross sectional elevation of the device of FIG. 1.

FIG. 3 is an exploded elevation of the device of FIG. 1.

FIG. 4 is an exploded perspective view of the device of FIG. 1 and an odometer cable threadedly engaged with a transmission via a coupling in accordance with the first embodiment of the present invention.

FIG. 5 is a perspective view of a disconnection prevention device surrounding the coupling of FIG. 4.

Like numerals refer to like parts throughout the several views of the drawings.

DETAILED DESCRIPTION OF THE PREFERRED EMBODIMENTS

Figure 6:
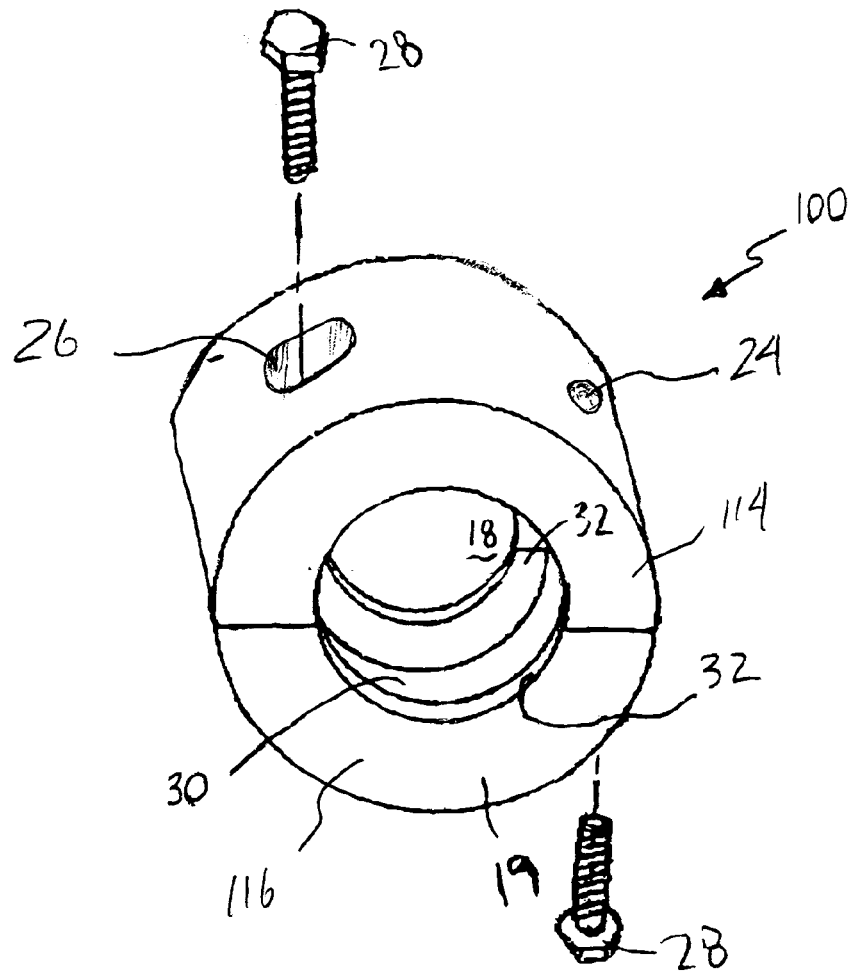
FIG. 6 is a perspective view showing a disconnection prevention device in accordance with a second embodiment of the present invention.

Referring to FIGS. 1–3, a first embodiment of a device 10 for preventing disconnection of a coupling 12 in an odometer cable assembly is shown. It will be understood that similar couplings other than those located on odometer cables can be protected by the device 10 described herein. A conventional odometer cable coupling is described herein simply for exemplary purposes.

Preferably, the device 10 is comprised of a glass reinforced resin or other plastic. Alternatively, the device 10 can be cast, stamped or machined from aluminum steel or other rigid metal or other material that is strong enough to prevent unauthorized persons from damaging, cutting through or breaking the device 10. Device 10 includes first and second halves 14 and 16 which are mateable to form a generally central opening 18 and surround the coupling 12. In operation, the coupling 12 is at least partially disposed in the opening 18. The device 10 has a longitudinal axis A that extends axially through opening 18, and transverse axis B which is generally perpendicular to axis A The first and second halves 14 and 16 are preferably identical to one another according to the first embodiment of the invention and, therefore, for ease of description, like numerals will be used to describe similar elements of the first and second halves 14 and 16. However, it will be understood that variations of either or both halves are within the scope of the invention depending on the coupling that the device is provided to surround. Each half 14 and 16 has a generally semi-circular middle portion 19 with opposing ends 20 and 22 that extend laterally therefrom along axis B, as best shown in FIG. 3. Formed in one end 20 of each half 14 and 16 is a threaded hole 24 adapted to threadedly receive a threaded fastener 28, and formed at the opposite end 22 is a socket hole 26. Preferably, threaded hole 24 and socket hole 26 extend substantially perpendicularly with axis B.

The middle portion 19 of each half has an inner surface 30 with a pair of opposing, preferably semi-circular flanges 32 projecting therefrom. Preferably, the flanges 32 extend from the inner surface 30 at a substantially right angle, as shown in FIG. 1. When the two halves 14 and 16 are mated, the exposed ends 32a of each opposing flange 32 engage one another, thereby forming a continuous surface that partially defines opening 18. Opposite ends 20 and 22 have inner surfaces 34 and 36 respectively, which are mateable with the inner surface 36 and 34, respectively, of an opposite half.

Referring to FIGS. 4 and 5, in a conventional odometer cable assembly, a cable 80 is threadedly coupled to the transmission 82 by a coupling 12. To install the device 10, the first and second halves 14 and 16 are fitted over coupling 12 and mated such that threaded hole 24 and socket hole 26 at opposite ends of the device 10 are aligned. In a preferred embodiment, a pair of threaded fasteners 28 are provided, one with each half 14 and 16, as shown in FIG. 1. For each half 14 and 16, the threaded fastener 28 is slipped into the socket hole 26 and threaded into the threaded hole 24. A washer, lock washer or the like can be provided for use with the threaded fastener 28.

In the first embodiment, the threaded fastener 28 is engaged and disengaged into and from the socket hole 26 and threaded into the threaded hole 24 of the opposite half by using a thin-wall deep socket, thereby pulling the opposing inner surfaces 34 and 36 into contact and enclosing coupling 12 within opening 18. Thin-walled deep sockets are not readily available, thus making removal of the threaded fastener 28 from the device 10 difficult for the typical operator. A thin-walled deep socket is employed because, in a preferred embodiment, the socket hole 26 is sufficiently deep so as to prevent a standard thin-wall short socket from reaching the threaded fastener 28, and of sufficiently small diameter so as to prevent thick-walled sockets from fitting in socket hole 26. Standard sized socket sets are well known in the art, and a skilled artisan will understand what standard sized thin-walled and thick-walled sockets are.

Threaded fastener 28 can be any threaded fastener known to those skilled in the art. For example, a bolt or screw, etc. can be employed. However, the threaded fastener 28 is preferably not a conventional hex-head fastener. In a preferred embodiment, the threaded fastener 28 has a 5-sided head. However, it is within the scope of the invention for the head of the threaded fastener 28 to have any conventional shape or number of sides. For example, the head of the threaded fastener 28 can be triangular, star-shaped, square, etc. A non-conventionally shaped threaded fastener 28 makes the removal of the device 10 even more difficult because the socket must conform to the shape of the threaded fastener head 28. Sockets that are non-hex-headed are not readily available. It should be understood that the shape of the head of the threaded fastener 28 and the size of socket hole 26 are not limitations on the present invention.

The shape of the first and second halves 14 and 16 is in no way a limitation on the present invention. Any configuration that includes a plurality of mateable pieces, which are threadedly connected, thereby forming an opening wherein a coupling can be enclosed is within the scope of the present invention.

Referring to FIG. 6, a second embodiment of a device 100 for surrounding and preventing disconnection of a coupling 12 in an odometer cable assembly is shown. This embodiment is a modification of the first embodiment, wherein the opposite ends 20 and 22 are omitted. In the second embodiment, the device 100 includes two generally semi-circular, opposing, mateable halves 114 and 116. A socket hole 26 and a threaded hole 24 are formed in the semi-circular portion of each half, as shown in FIG. 6, such that, when mated, the socket hole 26 of one half 114 aligns with the threaded hole 24 of the opposite half 116, and vice versa.

Figure 7:
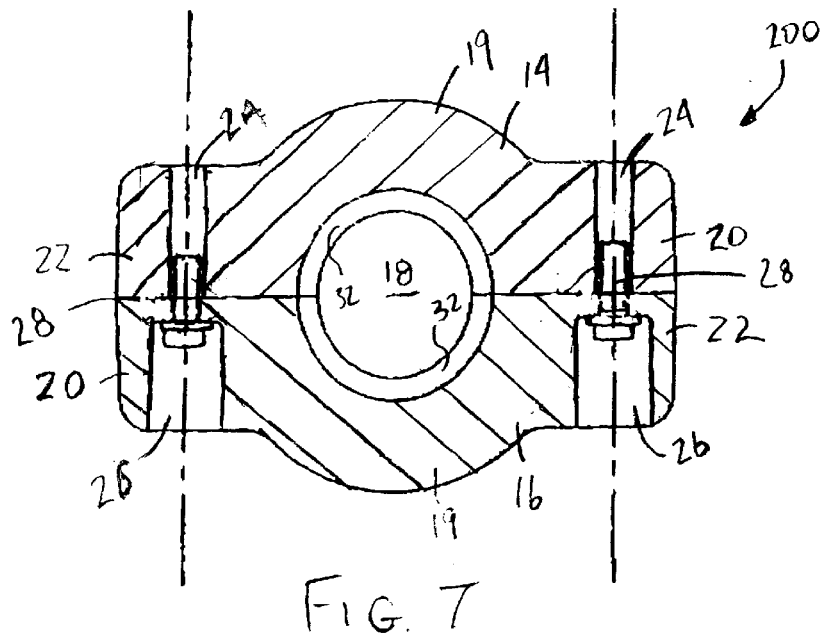
FIG. 7 is a cross sectional elevation showing a disconnection prevention device having both socket holes formed in one half and both threaded holes formed in the opposite half in accordance with a third embodiment of the present invention.

Referring to FIG. 7, a third embodiment of a device 200 for surrounding and preventing disconnection of a coupling 12 in an odometer cable assembly is shown. This embodiment is a modification of the first embodiment, wherein both socket holes 26 are formed in one half, and both threaded holes 24 are formed in the opposite half.

It will be understood that the size of the device depends on the coupling 12 that the device is provided to surround. The dimensions of the device are in no way a limitation on the present invention.

In the exemplary embodiments shown in the drawings, the middle portion 19 and the device 100 are generally circular in shape and the inner surface 30 and flanges 32 are generally semi-cylindrical and semi-circular. However, it is to be understood that the outside shape of the middle portion 19 and device 100 can be square, oval or any other geometric shape, depending on the configuration of the coupling to be surrounded.

Figure 8:
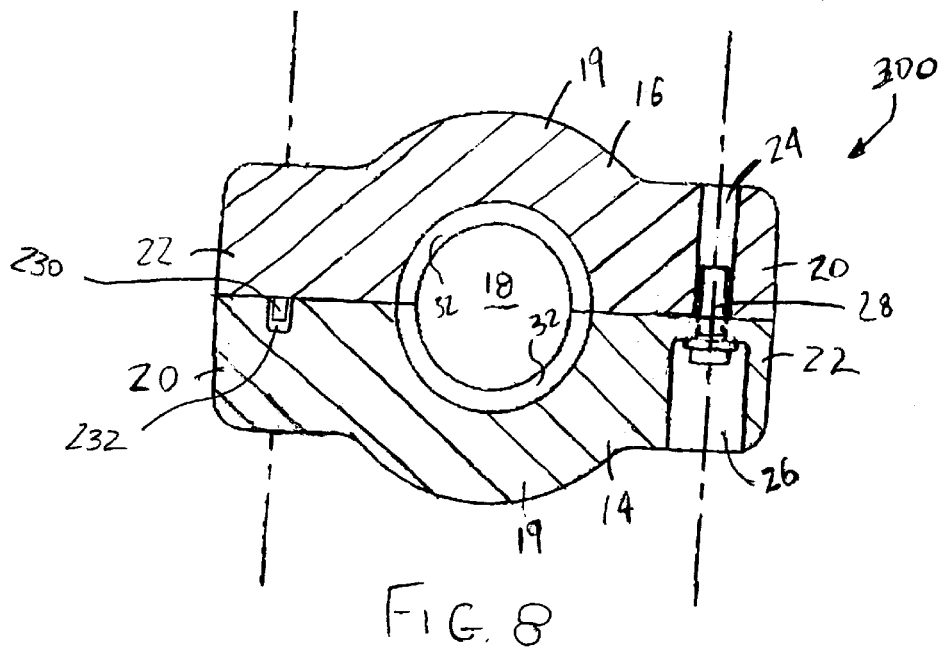
FIG. 8 is a cross-sectional elevation showing a disconnection prevention device having means for preventing the halves from rotating relative to one another in accordance with an alternative embodiment of the present invention.

The embodiments of the present invention recited herein are intended to be merely exemplary and those skilled in the art will be able to make numerous modifications to them without departing from the spirit of the present invention. For example, the inner surfaces 34 and 36 can include pegs or the like and opposite holes for aiding in the alignment of the two halves 14 and 16 or for preventing rotation of the two halves 14 and 16 relative to one another. FIG. 8 shows an alternative embodiment wherein a device 300 includes one socket hole 26 defined in end 22 of the first half 14, and one threaded hole 24 defined in end 20 of the second half 16. At the opposite end 22 of the second half 16 is a peg 230 extending from the inner surface 34 thereof. The first half 14 has a hole 232 defined in end 20 that is adapted to receive peg 230 when the first and second halves 14 and 16 are mated. In operation, when a threaded fastener 28 is received by socket hole 26 and threaded into threaded hole 24, hole 232 receives peg 230, thereby preventing the first half 14 from rotating relative to the second half 16. Other means for preventing rotation of one half relative to the other are within the scope of the invention. For example, any of the following can be used: a plurality of pegs and corresponding holes, clasp(s), hook(s), flange(s), stop(s) and the like. Alternatively, the device 300 can be hinged, ribbed or splined.

What is claimed is:

1. A shielded coupling assembly for use with a vehicle odometer comprising: an odometer cable having a length; a coupling disposed along said length; a device for shielding the coupling having: a first section and a second section mateable with each other to form a cover for the coupling, the cover defining an opening therethrough, each section having a first flange extending from a first peripheral edge and a second flange extending from a second peripheral edge, the first and second flanges of each section defining a cavity, wherein the coupling is positioned at least partially in the cavity, said first and second sections further having a plurality of holes defined through said first and second sections, said plurality comprising:

(a) a socket hole, said socket hole being defined in one of said first and second sections, and (b) a threaded hole defined in the other of said first and second sections, said threaded hole being opposed to said socket hole.

2. A shielded coupling assembly for use with a vehicle odometer comprising: an odometer cable having a length; a coupling disposed along said length; a device for shielding the coupling having: a first section and a second section mateable with each other to form a cover for the coupling, the cover defining an opening therethrough, each section having a first flange extending from a first peripheral edge and a second flange extending from a second peripheral edge, the first and second flanges of each section defining a cavity, wherein the coupling is positioned at least partially in the cavity, said first and second sections further comprising:

(a) a plurality of holes defined through said first and second sections, said plurality comprising:

(i) a first socket hole defined in one of said first and second sections, (ii) a first threaded hole defined in the other of said first and second sections and opposed to said first socket hole, (iii) a second socket hole defined in one of said first and second sections, (iv) a second threaded hole defined in the other of said first and second sections and opposed to said second socket hole, wherein said first and second socket holes are defined on opposite sides of said opening and wherein each socket hole is aligned with a corresponding threaded hole, and (b) two threaded fasteners, wherein each threaded fastener respectively engages one of said socket holes and threadedly engages the aligned threaded hole.

3. The device of claim 2 wherein said first socket hole and said second threaded hole are defined in said first section, and wherein said second socket hole and said first threaded hole are defined in said second section.

4. The device of claim 2 wherein said first and second socket holes are defined in said first section, and wherein said first and second threaded holes are defined in said second section.

5. The device of claim 2 wherein each section has a middle portion and opposite ends extending therefrom, and wherein said plurality of holes are respectively defined in said opposite ends of each section.

6. The device of claim 2 wherein at least one of said two threaded fasteners has a non-hexagonal head.

7. The device of claim 2 wherein said flanges extend from said inner surface at a substantially right angle.

* * * * *